J. A. McLANE.
METHOD AND MEANS FOR APPLYING LEGENDS OR DESIGNS TO TIRES.
APPLICATION FILED MAR. 1, 1920.
1,371,501.
Patented Mar. 15, 1921.
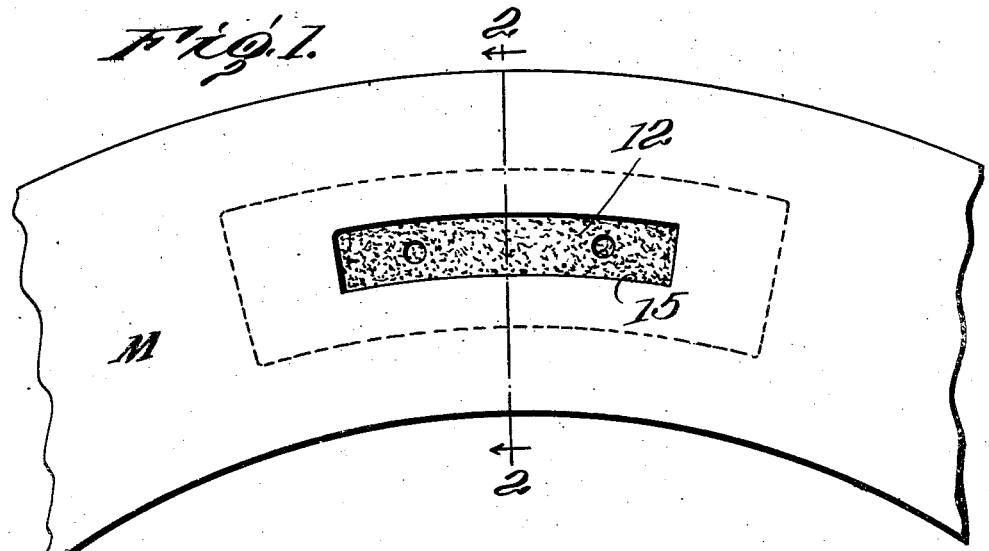
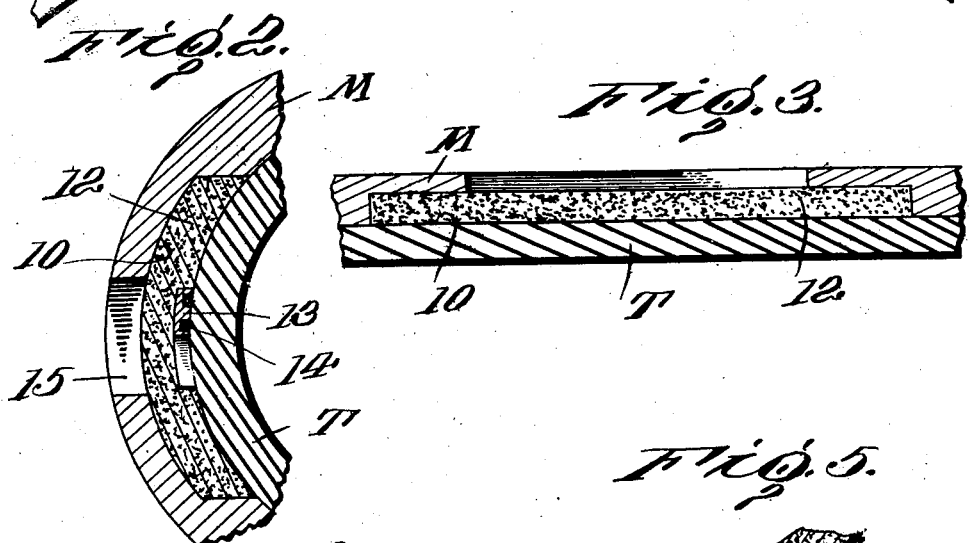
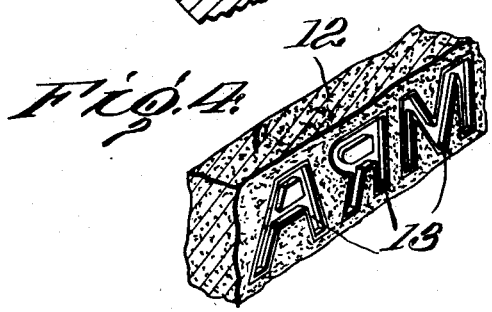
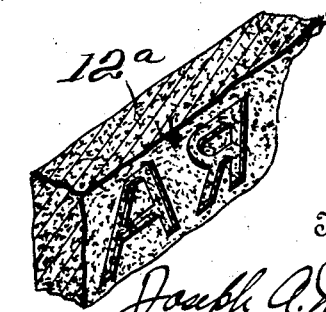
Inventor
Joseph A. McLane
By
his Attorney

UNITED STATES PATENT OFFICE.

JOSEPH A. McLANE, OF MORGANTOWN, WEST VIRGINIA, ASSIGNOR TO THE ARMOR-CORD RUBBER COMPANY, OF MORGANTOWN, WEST VIRGINIA, A CORPORATION OF WEST VIRGINIA.

METHOD AND MEANS FOR APPLYING LEGENDS OR DESIGNS TO TIRES.

1,371,501.   Specification of Letters Patent.   Patented Mar. 15, 1921.

Application filed March 1, 1920. Serial No. 362,520.

*To all whom it may concern:*

Be it known that I, JOSEPH A. McLANE, a citizen of the United States, residing at Morgantown, in the county of Monongalia and State of West Virginia, have invented a new and useful Method and Means for Applying Legends or Designs to Tires, of which the following is a specification.

This present invention is a method and means for effecting any desired legend or design on rubber articles, preferably the side walls of tire, tire casings or shoes.

So far as is known, the trade name of the tire, the name of the maker and designs have been provided on the outer surface of tires, by depressed or projected characters permanently formed on the inner face of the tire mold, whereby the corresponding impressions are transferred to the outer surface of the tire while being cured or vulcanized. It is also understood that it has been proposed to provide legends and designs on tires by applying labels of vulcanizable rubber having the desired legend or design thereon, the tag or sheet of rubber being vulcanized to the tire wall in a suitable manner.

In practice, however, it often occurs that dealers or an individual ordering a supply of tires desires a certain distinctive legend or design on the tires in order to distinguish their goods on the market or to meet the needs or fancies of the individual purchaser.

As the molds which are necessary in the making of these tires are very expensive, it is impracticable, expensive and unexpedient to have separate molds for the different customer requiring distinctive legends or designs.

It is the purpose of the invention, therefore, to provide a method and a means applicable to all molds, including those now in use, by which any legend or design may be provided on the outer surface of tires according to the desire of the particular purchaser. Furthermore, the invention provides for the legends or design to be of any desired or contrasting color, to be in relief or intaglio as the purchaser may fancy.

It is the further object and purpose of the invention to provide a method and a means, as above set forth, for economically carrying the invention into practice and which is practicable and simple.

The method of applying a selected legend or design to the outer surface of tires, according to the invention, broadly consists in removably arranging in the tire mold, before the tire is vulcanized or cured, a matrix or matrix-holder having the desired legend or design thereon. It is preferred at present, however, to form the matrix-holder of hard non-vulcanizable rubber; but, first, setting into the holder while in its unvulcanized state the desired arrangement of separate matrix units. The holder is then vulcanized and the matrix units securely embedded therein with their grooved or recessed faces flush with a surface of the holder. It is, also, within the scope of the invention to press, stamp or cut the legend or design into a block or plate of hard rubber, fiber, metal or other suitable material, thus eliminating the use of separate matrix units.

In either case, the grooved or recessed faces of the matrices are then filled with vulcanizable rubber stock, which may be colored to obtain any variation or contrast. The next step is to removably insert the matrix-holder into the tire mold so that the matrices thereof will be in opposing and juxta-relation with the outer surface of the tire. From this point on, the process is coupled with the usual curing or vulcanizing process of the tire itself during which the rubber stock in the recesses of the matrices fuses or coalesces with the rubber stock of the tire and becomes an integral, permanent part of the tire. When the tire is removed from the mold it bears the selected legend or design. Of course, it is within the purview of the invention to have the legend or design in relief or intaglio.

The foregoing states the steps of the present method and in the accompanying drawings a means is shown by which the method is carried out.

Referring particularly to the drawings:

Figure 1 is a fragmentary side elevation of a tire mold equipped with the means for carrying out the present invention, Fig. 2 is a fragmentary section view taken substantially on line 2—2 of Fig. 1, Fig. 3 is a horizontal section view taken substantially on line 3—3 of Fig. 2, Fig. 4 is a fragmentary detailed view of the matrix-holder having matrices assembled therein, and Fig. 5 is a modified form of matrix and holder shown in Fig. 4.

The means disclosed in the drawings comprises a matrix holder 12, of suitable material, preferably hard vulcanized rubber, removably and fittedly received in a recess 10, formed in the inner surface of the usual tire mold. The inner exposed face, of the holder is formed to take the same contour as that of the walls of the mold. The holder 12 has embedded therein matrix units 13 which are arranged to form any suitable legend or design. These matrix units 13 are, preferably, of metal having grooved or recessed faces 14, which, as shown in Figs. 2 and 4, are flush with the inner face of the holder. The grooves or recesses of the matrices are to be packed with rubber stock which will coalesce with the rubber stock of the tire, during the curing process of the tire.

The matrices arranged, as shown in Figs. 2 and 3, will of course produce the legend or design in relief on the surface of the tire. In some instances, it may be desirable to have the legend or design in intaglio, and in such event the matrices 13 are projected slightly beyond the surface of the holder 12, instead of being flush therewith, as shown in Figs. 2 and 4.

In Fig. 5, an embodiment is shown, wherein, the holder or block 12ª has the legend or design stamped, cut or pressed therein. The matrices are to be packed with rubber stock and the block or holder 12ª removably inserted in the recess 10 in the mold, after the manner just described.

It is understood that the holder 12 or block 12ª is of hard non-vulcanized rubber and, therefore, will not coalesce or vulcanize with the rubber stock of the tire during the tire curing process.

In order to permit the easy removal of the holders 12 and 12ª from the tire mold, it has been provided with a slot 4 extending from the outer surface of the mold and communicating with the recess therein, so that pressure may be applied against the back of the holder to force the latter from said recess.

The holders 12 and 12ª, bearing the desired legend or design, after being used for one order of tires, may be held in reserve until renewal order is called for; or, it may be discarded, after recovering the matrix units 13 therefrom, with little loss.

It will thus be seen that the present invention provides for any desired legend or design, or both, to be applied to tires, during the process making, without requiring separate molds for tires bearing the different legends or designs.

It is to be understood that the invention, in its broad conception, is not limited to the specific steps of the method and details of construction above shown and described, except as specifically stated in the claims, as certain changes in the precise steps of the method and details of construction and combination of the means for carrying out the method may be made which fall within the scope of the claims.

Having fully described the invention, what I claim to be new and desire to obtain Letters Patent upon is:

1. A method of affixing selected legends or designs to articles, which consists in arranging a plurality of matrix units in a matrix holder to form the selected legend or design; then applying to the surface of the matrix vulcanizable material, and subsequently arranging the matrix holder in juxta-relation to the article, and then subjecting the article to a vulcanizing process.

2. A method of affixing selected legends or designs to rubber articles, during their molding or vulcanization; consisting in filling the surface of a matrix bearing the selected legend or design with vulcanizable rubber stock, in arranging the matrix within a mold to be in juxta-relation to the article; and then subjecting the article, contained in the mold, to a molding or vulcanizing process, whereby the rubber stock on the surface of the matrix will adhere or coalesce with the rubber stock of the article.

3. A method of affixing selected legends or designs to rubber articles; consisting in arranging a matrix in rubber stock and then vulcanizing said stock to a non-vulcanizable condition, thus forming a matrix holder maintaining the matrix in position; in removably placing said holder in a mold in which the article may be contained and positioning it so that the matrix thereof will lie in juxta-relation to the article, and then subjecting the mold containing the article to a molding or vulcanizing process.

4. A method of affixing selected legends or designs to rubber articles; consisting in arranging a plurality of matrix units in rubber stock so as to effect the desired legend or design; then vulcanizing said stock to a non-vulcanizable condition, thus forming a matrix holder to maintain the matrix units in position; in removably placing said holder in a mold in which the article may be contained, and positioning it so that the matrics thereof will be in juxta-relation to the article; and then subjecting the mold containing the article to molding or vulcanizing process.

5. A method of affixing selected legends or designs to rubber articles; consisting in arranging a plurality of matrix units in rubber stock so as to effect the desired legend or design; then vulcanizing said stock to a non-vulcanizable condition, thus forming a matrix holder to maintain the matrix units in position in filling the matrix with vulcanizable rubber; then placing said holder in a mold in which the article may be contained, and positioning it so that the matrices thereof will be in juxta-relation to the article; and then subjecting the mold containing the article to molding or vulcanizing process whereby the rubber stock on the surface of the matrices will adhere or coalesce with the rubber stock of the article.

6. Means by which selected legends or designs may be applied to rubber articles comprising, in combination, a mold for the article having a recess in its molding surfaces, a matrix-insert removably fitted in the recess and having the legend or design thereon to oppose the article receivable in mold, said mold further having means accessible from the exterior thereof through which the matrix may be ejected from the recess.

7. Means by which selected legends or designs may be applied to rubber articles comprising, in combination, a mold for the article having a recess in its molding surfaces, and a matrix holder having a plurality of matrix-units secured therein to effect the selected legend or design, said holder being removably fitted in said recess of the mold and having its inner face shaped to conform to the molding surface of the mold, the matrix-units being positioned to oppose the surface of the article, when in the mold.

8. Means by which selected legends or designs may be applied to rubber articles comprising, in combination, a mold for the article having a recess in its molding surfaces, and a matrix holder having a plurality of matrix-units secured therein to effect the selected legend or design, said holder being removably fitted in said recess of the mold, the matrix-units having their faces grooved to receive vulcanizable rubber stock and positioned to oppose the surface of the article, when in the mold.

In testimony whereof I have hereunto set my hand.

JOSEPH A. McLANE.